Patented Aug. 27, 1940

2,212,810

UNITED STATES PATENT OFFICE 2,212,810

AZEOTROPIC DISTILLATION

Edmund Field, Wilmington, Del., assignor to E. I. du Pont de Nemours & Company, Wilmington, Del., a corporation of Delaware No Drawing. Application February 6, 1940, Serial No. 317,531

20 Claims. (Cl. 202—42)

This invention relates to a method for separating substances which either boil closely together or form binaries such that separation cannot be achieved by simple fractional distillation. More particularly, this invention relates to the separation of cyclohexane from benzene.

It is an object of this invention to provide a method for separating closely boiling substances or substances which form azeotropes where separation by fractional distillation is difficult or impractical. It is a further object of this invention to provide a method for separating cyclohexane from benzene. Other objects and advantages of the invention will be apparent from the following specification.

According to the present invention, cyclohexane can be removed from a mixture containing cyclohexane and substances of similar boiling point, such as benzene (B. P. 80.1° C.) (which cannot be distilled ordinarly from cyclohexane, B. P. 80.8° C.) by adding acetone to the mixture and distilling. Acetone, I have found, forms a binary azeotrope with cyclohexane (67.3% acetone by weight) which boils at a lower temperature (53.1° C.) than either acetone or any benzene-cyclohexane mixture. Thus, I have found that a weight ratio of acetone to cyclohexane of at least 2.0:1 is preferable when distilling under a pressure of one atmosphere.

If it is desired subsequently to recover benzene and cyclohexane each in the pure form, the distillation is continued. The excess acetone distills following the acetone-cyclohexane azeotrope, but at a higher temperature, and finally benzene in the pure form is obtained. The acetone-cyclohexane binary is then processed with water.

Preferably this involves water washing of the binary which is carried out by conducting the binary to the bottom of a baffled tower down which water is flowing. The counter-current flow of water and binary effects solution of acetone in the water and release of the cyclohexane which rises to the top of the tower and is removed by decantation. The acetone dissolved in the water may be recovered for further use by distillation from its mixture with water. The cyclohexane may be obtained chemically pure by removing the traces of residual water by distillation or by the use of common drying agents.

The process as above described may be applied to any mixture of compounds containing cyclohexane, provided the boiling temperatures of the additional constituents or any azeotropic mixture between such constituents or between such constituents and acetone are sufficiently remote from the boiling temperature of the cyclohexane-acetone binary. Even should the boiling temperatures be close, it will generally be found possible to vary the process to avoid this difficulty. For instance, should a mixture contain methyl acetate, in addition to benzene and cyclohexane, processing with acetone according to this invention permits of two azeotropes, a methyl acetate-acetone mixture boiling at 56.1° C. and a cyclohexane-acetone mixture boiling at 53.5°, whose proximity of boiling temperatures may make separation difficult. Under such conditions, the methyl acetate is preferably distilled from the mixture before the addition of the acetone to avoid, thereby, the presence of the methyl acetate-acetone azeotrope. In certain cases involving constituents, part of which are water soluble, water extraction may be substituted for distillation. None of these priliminary treatments are necessary, however, in the following illustrative case, the technique of which I have successfully employed in conjunction with a process for the simultaneous manufacture of acetone and cyclohexane by exchange of hydrogen between isopropanol and benzene described in copending application of E. P. Bartlett, Serial No. 265,932.

As a process of this type involves an equilibrium, the product is a mixture of isopropanol, acetone, benzene and cyclohexane. Such a mixture contains constituents for forming at least three different azeotropic mixtures, benzene-isopropanol (B. P. 71.9°), cyclohexane-isopropanol (B. P. 68.6°), both of which are revealed in the literature, and acetone-cyclohexane (B. P. 53.1°). From such a mixture cyclohexane can be removed quantitatively as its azeotrope with acetone. The acetone-cyclohexane mixture is then separated into its constituents by countercurrent water extraction such as previously outlined, or by some other convenient, well known device. Acetone is recovered from the water solvent by simple distillation. The cyclohexane is dried either by a suitable drying agent or by a process of distillation which takes advantage of the convenient cyclohexane-water pseudo-azeotrope.

Following the removal of cyclohexane, the residual mixture of acetone, isopropanol and benzene is tapped to remove acetone, and the unconverted benzene and isopropanol are returned to the hydrogenation unit for reprocessing.

While I have illustrated my invention by certain applications, I do not limit my claims to such specific cases, for there are many possible problems of separation where solutions may employ as a basic principle the recovery of cyclohexane from mixtures by means of its azeotrope with acetone. Thus, for example, although not specifically mentioned previously, the recovery of acetone from mixtures of substances having similar boiling temperatures may also be accomplished according to the present invention. In other words, although the specification has been directed primarily to the removal of cyclohexane, the reverse is also true. Acetone may be removed from mixtures by the use of cyclohexane, thereby employing the binary or azeotrope of acetone and cyclohexane.

I claim:

1. A method for the removal of cyclohexane from admixture with other substances which comprises treating the cyclohexane-containing mixture with acetone and distilling off the resultant cyclohexane-acetone azeotrope.

2. A method for the removal of cyclohexane from admixture with other substances which comprises treating the cyclohexane-containing mixture with acetone and distilling off the resultant cyclohexane-acetone azeotrope and thereafter removing the cyclohexane by treating the resultant distillate with water.

3. A method for the removal of cyclohexane from admixture with other substances which comprises treating the cyclohexane-containing mixtures with acetone in the ratio of at least 2.0 parts of acetone per part of cyclohexane and thereafter distilling off the resultant cyclohexane-acetone azeotrope.

4. A method for the removal of cyclohexane from admixture with other substances which comprises treating the cyclohexane-containing mixtures with acetone in the ratio of at least 2.0 parts of acetone per part of cyclohexane and thereafter distilling off the resultant cyclohexane-acetone azeotrope and thereafter removing the cyclohexane by treating the resultant distillate with water.

5. A method for the removal of cyclohexane from admixture with other substances which comprises treating the cyclohexane-containing mixtures with acetone in the ratio of 2 parts of acetone per part of cyclohexane and thereafter distilling off the resultant cyclohexane-acetone binary.

6. A method for the removal of cyclohexane from admixture with other substances which comprises treating the cyclohexane-containing mixtures with acetone in the ratio of 2 parts of acetone per part of cyclohexane and thereafter distilling off the resultant cyclohexane-acetone binary and thereafter removing the cyclohexane by treating the resultant distillate with water.

7. A process for the removal of cyclohexane from a mixture containing benzene and cyclohexane which comprises treating the cyclohexane-containing mixture with acetone and distilling off the resultant cyclohexane-acetone azeotrope.

8. A process for the removal of cyclohexane from a mixture containing benzene and cyclohexane which comprises treating the cyclohexane-containing mixture with acetone and distilling off the resultant cyclohexane-acetone azeotrope and thereafter removing the cyclohexane by treating the resultant distillate with water.

9. A process for the removal of cyclohexane from a mixture containing benzene and cyclohexane which comprises treating the cyclohexane-containing mixtures with acetone in the ratio of at least 2.0 parts of acetone per part of cyclohexane and thereafter distilling off the resultant cyclohexane-acetone azeotrope.

10. A process for the removal of cyclohexane from a mixture containing benzene and cyclohexane which comprises treating the cyclohexane-containing mixtures with acetone in the ratio of at least 2.0 parts of acetone per part of cyclohexane and thereafter distilling off the resultant cyclohexane-acetone azeotrope and thereafter removing the cyclohexane by treating the resultant distillate with water.

11. A process for the removal of cyclohexane from a mixture containing benzene and cyclohexane which comprises treating the cyclohexane-containing mixtures with acetone in the ratio of 2 parts of acetone per part of cyclohexane and thereafter distilling off the resultant cyclohexane-acetone binary.

12. A process for the removal of cyclohexane from a mixture containing benzene and cyclohexane which comprises treating the cyclohexane-containing mixtures with acetone in the ratio of 2 parts of acetone per part of cyclohexane and thereafter distilling off the resultant cyclohexane-acetone binary and thereafter removing the cyclohexane by treating the resultant distillate with water.

13. A process for the removal of cyclohexane from a mixture containing cyclohexane, benzene, isopropanol and acetone which comprises effecting an acetone-cyclohexane ratio at least equal to the ratio there between in the acetone-cyclohexane azeotrope and then distilling off the resultant acetone-cyclohexane azeotrope.

14. A process for the removal of cyclohexane from a mixture containing cyclohexane, benzene, isopropanol, and acetone which comprises effecting an acetone-cyclohexane ratio of at least 2.0 to 1 and then distilling off the resultant acetone-cyclohexane azeotrope.

15. A process for the removal of cyclohexane from a mixture containing cyclohexane, benzene, isopropanol and acetone which comprises effecting an acetone-cyclohexane ratio of 2 to 1 and then distilling off the resultant acetone- cyclohexane azeotrope.

16. A process for the removal of cyclohexane from a mixture containing cyclohexane, benzene, isopropanol and acetone which comprises effecting an acetone-cyclohexane ratio above the ratio therebetween in the acetone-cyclohexane azeotrope and then distilling off the resultant acetone-cyclohexane azeotrope and thereafter removing the cyclohexane by treating the resultant distillate with water.

17. A process for the removal of cyclohexane from a mixture containing cyclohexane, benzene, isopropanol and acetone which comprises effecting an acetone-cyclohexane ratio of at least 2.0 to 1 and then distilling off the resultant acetone-cyclohexane azeotrope and thereafter removing the cyclohexane by treating the resultant distillate with water.

18. A process for the removal of cyclohexane from a mixture containing cyclohexane, benzene, isopropanol and acetone which comprises effecting an acetone-cyclohexane ratio of 2 to 1 and then distilling off the resultant acetone-cyclohexane azeotrope and thereafter removing the cyclohexane by treating the resultant distillate with water.

19. A method of removing a substance selected from the group consisting of acetone and cyclohexane from admixture with other substances which comprises treating the mixture with the other substance from the group and distilling off the resultant cyclohexane-acetone azeotrope.

20. A method for the removal of acetone from admixture with other substances which comprises treating the acetone-containing mixture with cyclohexane and distilling off the resultant cyclohexane-acetone azeotrope.

EDMUND FIELD.